(12) United States Patent
Meckstroth et al.

(10) Patent No.: US 7,118,504 B2
(45) Date of Patent: Oct. 10, 2006

(54) HYDRAULIC ASYMMETRIC DAMPED BELT TENSIONER

(75) Inventors: Richard J. Meckstroth, Vonore, TN (US); Joseph W. Zamm, Rochester, MI (US)

(73) Assignee: Dayco Products, LLC, Miamisburg, OH (US)

( * ) Notice: Subject to any disclaimer, the term of this patent is extended or adjusted under 35 U.S.C. 154(b) by 462 days.

(21) Appl. No.: 10/421,451

(22) Filed: Apr. 23, 2003

(65) Prior Publication Data

US 2003/0216205 A1 Nov. 20, 2003

Related U.S. Application Data

(63) Continuation-in-part of application No. 10/071,629, filed on Feb. 7, 2002, now Pat. No. 6,884,194.

(51) Int. Cl.
F16H 7/12 (2006.01)
(52) U.S. Cl. .................. 474/135; 474/134; 474/109
(58) Field of Classification Search ........ 474/133–138, 474/109–117, 102–104; 137/38, 248, 340, 137/527, 625.5
See application file for complete search history.

(56) References Cited

U.S. PATENT DOCUMENTS

| | | | |
|---|---|---|---|
| 4,583,962 A | 4/1986 | Bytzek et al. |
| 4,596,538 A | 6/1986 | Henderson |
| 4,822,322 A | 4/1989 | Martin |
| 4,832,666 A | 5/1989 | Henderson |
| 4,938,734 A | 7/1990 | Green et al. |
| 5,030,172 A | 7/1991 | Green et al. |
| 5,035,679 A | 7/1991 | Green et al. |
| 5,171,188 A | 12/1992 | Lardrot et al. |
| 5,190,502 A | 3/1993 | Gardner et al. |
| 5,348,514 A | 9/1994 | Foley |
| 5,354,242 A | 10/1994 | St. John |
| 5,443,424 A | 8/1995 | Henderson |
| 5,924,947 A | 7/1999 | Williams |
| 5,935,032 A | 8/1999 | Bral |

*Primary Examiner*—Marcus Charles
(74) *Attorney, Agent, or Firm*—Joseph V. Tassone; Thompson Hine LLP

(57) ABSTRACT

A belt tensioner for a power transmission belt may be provided that operates on an endless path and that utilizes asymmetric motion control. The belt tensioner may have an arm with a belt engaging section and a drum section, a support member for securing the tensioner relative to the belt, where the arm pivots on the support member, and a tension spring that urges the arm to pivot about the support member in a first direction and urges the belt engaging section against the belt with a force to tension the belt. The tensioner also may have a fluid filled chamber inside a portion of the drum section of the arm and a valve pivotally attached to the tensioner so that the valve extends across the fluid containing chamber.

11 Claims, 7 Drawing Sheets

HYDRAULIC ASYMMETRIC DAMPED BELT TENSIONER

CROSS REFERENCE TO RELATED APPLICATIONS

This application is a continuation-in-part of application Ser. No. 10/071,629, filed Feb. 7, 2002, now U.S. Pat. No. 6,884,194, issued Apr. 26. 2005.

TECHNICAL FIELD

The present application relates generally to a new belt tensioner for a power-transmitting belt, and more particularly to a hydraulic asymmetric damped belt tensioner.

BACKGROUND

Many automobile engines currently on the market utilize an endless power transmission belt for driving a plurality of driven accessories. They employ a tensioning system utilized to provide a tensioning force on the endless power transmission belt, which may be of any suitable type known in the art. Preferably, the belt is made primarily of a polymeric material because the unique features of the tensioner of these embodiments readily permit the tensioner to tension a belt having a polyester load-carrying cord in an efficient manner.

In many of these automotive accessory drives it is necessary to provide a correct tension to control a tension ratio throughout the life of the belt. With the advent of the single belt V-ribbed drive system, this is of increasing importance since belts are longer and some accessories are driven off the backside of the belt as a flat belt drive. Automatic tensioners of various descriptions have been developed having the requisite characteristics enabling them to tune the belt system to remove input torsionals and prevent or reduce harmonics, while allowing the tensioner to respond to changes in the belt tension requirements. For instance, see U.S. Pat. Nos. 4,596,538, 4,832,666, and 5,443,424 to Henderson, U.S. Pat. Nos. 4,938,734, 5,030,172 and 5,035,679 to Green, et. al., U.S. Pat. No. 5,190,502 to Gardner, et. al., or U.S. Pat. No. 5,348,514 to Foley, all now incorporated into this application by this reference thereto. A problem is that a torsion spring cannot be made with sufficient rate to both resiliently tension a belt and prevent bubble or slack length from developing in the belt during periods of extreme engine deceleration, i.e., that allows for asymmetric damping.

For optimal function of a V-ribbed, flat belt, or V belt tensioner, it is desirable that the tensioner moves easily and quickly toward the belt to take up slack (spring unwind direction), but provide more than the same resistance to a belt lifting of the tensioner away from the belt (spring windup direction). This feature is desirable for proper control of steady state accessory torque loads that are occasionally interrupted with a non-steady state or reverse transient load, such as a wide-open-throttle (WOT) one-two gear shift in manual and automatic transmission. During WOT, the engine suddenly goes from, for example, 5000 RPM to 3500 RPM, which is similar to putting a brake on the engine. The tensioner then becomes an untensioner, which can cause lock-up and belt slip because the tensioner does not like to be lifted off the belt or move when the belt pulls, the tensioner only likes to go toward the belt.

Also, allowing the tensioner to move easily and quickly toward the belt to take up slack (spring unwind direction), but providing more than the same resistance to a belt lifting of the tensioner away from the belt (spring windup direction) is desirable to control engine start up transients to slow combustion events and rapid engine acceleration during first firing. Further, this motion is desirable to control torque pulses of engines having lightweight flywheels or "dual mass" flywheels, where the combustion torque variation can exceed levels equal to the average accessory torque load at idle at the crankshaft driver pulley.

It is known to have asymmetric motion control using hydraulic linkage with directional fluid orifices that require a piston, an orifice, and a check valve, for instance see U.S. Pat. No. 5,924,947 to Williams.

It is know to have non-hydraulic asymmetric motion control systems that do not have viscous damping, for instance see U.S. Pat. No. 4,822,322 to Martin et. al. and U.S. Pat. No. 4,583,962 to Bytzek.

It is also known to have asymmetric motion control using dry or lubricated surface friction, such as a brake band, which is limited in its ability to provide asymmetric motion by the amount of angular vector shift with a change in rotational direction and that requires excessive rotational motion to tighten the band in the high torque direction, for instance see U.S. Pat. No. 5,354,242 to St. John.

It is also known to have asymmetric motion control using damping friction surfaces that are limited in friction torque developed by the amount of normal load that can be generated by a spring and that need lots of angular displacement to engage and disengage, where the displacement is amplified by a conical wedging action, for instance see U.S. Pat. No. 5,935,032 to Bral.

It is also known to have asymmetric motion control using an "elastomer sandwich" that is severely limited in range of operation by the very steep spring rates of the compressed elastomers and the tensioner suffers from a lack of angular rigidity since its center of pivot floats, and thus is not absolutely controlled, for instance see U.S. Pat. No. 5,171,188 to Lardrot.

The present embodiments overcome these deficiencies and accomplish the above-discussed functions for asymmetric motion control, and can be applied to any conventional rotating tensioner that uses a rotational spring to rotate the tensioner arm toward the belt to create belt tension.

SUMMARY

In a first aspect a belt tensioner for a power transmission belt that operates on an endless path is provided that utilizes asymmetric motion control. The tensioner has an arm with a belt engaging section and a drum section, a support member for securing the tensioner relative to the belt, where the arm pivots on the support member, and a tension spring that urges the arm to pivot about the support member in a first direction and urges the belt engaging section against the belt with a force to tension the belt. The tensioner also has a fluid containing chamber located inside a portion of the drum section of the arm. The tensioner may also have a valve pivotally attached to the tensioner so that the valve extends across the fluid containing chamber.

In another aspect a tensioner for generating tension in a power-transmitting belt as the belt traverses a first sheave and a second sheave is provided. The tensioner includes a base, an arm that is pivotably attached to the base, and a pulley that is rotatably attached to the arm for engaging the belt. A spring is operatively connected to the arm and the base for urging the arm to pivot in a first direction toward the belt, thereby urging the pulley into engagement with the belt with a force to tension the belt. The tensioner also includes an asymmetric fluid damper comprising a fluid containing chamber and a valve. The fluid containing chamber is located between the base and the arm and moves with the arm relative to the base. The valve is pivotably attached to the base so as to be pivotable between an open position and a closed position. When the arm moves in the first direction the flow of the fluid in the chamber pivots the valve to the open position. When the arm moves in a second direction the flow of the fluid in the chamber may pivot the valve to the closed position or hold the valve in the closed position. In the closed position, the valve is positioned in the fluid containing chamber to restrict fluid flow, thereby resisting movement of the arm in the second direction. In another embodiment, the tensioner may further include a solenoid having a plunger movable between a retracted position and an extended position. In the extended position the plunger engages the valve to lock the valve in the closed position, thereby resisting movement of the arm in the first and second directions.

In another aspect a tensioner system is provided for generating tension in a power-transmitting belt as the belt traverses a first sheave and a second sheave of an automobile engine. The tensioner system includes a first tensioner for tensioning a first span of the belt, a second tensioner for tensioning a second span of the belt, a sensor for obtaining a condition of the automobile engine, and a controller.

The first and second tensioners of the tensioner system each include a base, an arm that is pivotably attached to the base, and a pulley that is rotatably attached to the arm for engaging the belt. The pulley of the first tensioner engages a first span of the belt located between the first sheave and the second sheave. The pulley of the second tensioner engages a second span of the belt which may be located between the second sheave and a third sheave. Both of the tensioners also include a spring that is operatively coupled to the arm of the tensioner and the base of the tensioner for urging the arm to pivot in a direction toward the belt, thereby urging the pulley of the tensioner into engagement with the belt with a force to tension the belt.

The first and second tensioners further include an asymmetric fluid damper comprising a fluid containing chamber and a valve. The fluid containing chamber is located between the base and the arm and moves with the arm relative to the base. The valve is pivotably attached to the base so as to be pivotable between an open position and a closed position. When the arm moves in the direction toward the belt the flow of the fluid in the chamber pivots the valve to the open position. When the arm moves in a direction away from the belt the flow of the fluid in the chamber may pivot the valve to the closed position or hold the valve in the closed position. In the closed position the valve is positioned in the fluid containing chamber to restrict fluid flow, thereby resisting movement of the arm in the direction away from the belt. In addition, the tensioners include a solenoid having a plunger movable between a retracted position and an extended position. When in the extended position the plunger engages the valve to lock the valve in the closed position, thereby resisting movement of the arm in both directions.

The controller is operatively coupled to the sensor for receiving a signal therefrom and is operable to move the plungers of the tensioners between the retracted positions and the extended positions, based, at least in part, on the signal received from the sensor. The sensor may be a sensor for obtaining an engine speed of the engine.

DETAILED DESCRIPTION

Figure 1:
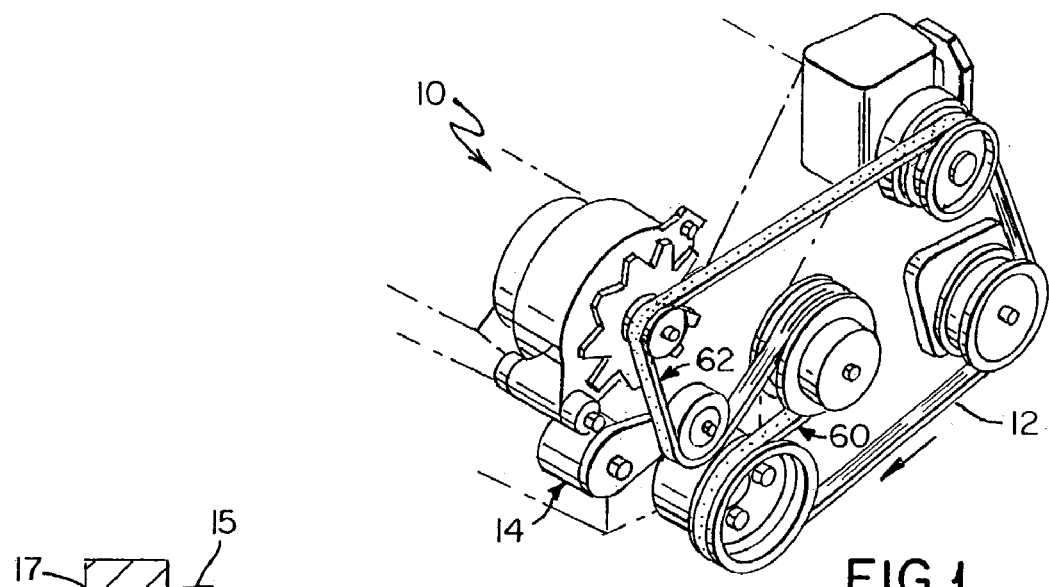
FIG. 1 is a perspective view of an automobile engine that utilizes a new belt tensioner.

While various features are hereinafter illustrated and described as providing a belt tensioner for a particular power transmission belt of a particular motor vehicle engine, it is to be understood that the various features can be utilized singly or in any combination thereof to provide a belt tensioner for other arrangements as desired. Therefore, the embodiments are not to be limited to only to those illustrated in the drawings, because the drawings are merely utilized to illustrate one of the wide variety of uses of the embodiments.

Referring now to FIG. 1, an automobile engine may be generally indicated by reference numeral 10 and may utilize an endless power transmission belt 12 for driving a plurality of driven accessories, as is well known in the art. The new belt tensioner is generally indicated by reference numeral 14 and is utilized to provide a predetermined tensioning force on the belt 12 in a manner hereinafter set forth. The endless power transmission belt 12 may be of any suitable type known in the art. The belt 12 may be made primarily of polymeric material because the unique features of the tensioner 14 readily permit the tensioner 14 to tension a belt having a load carrying cord in an effective manner as fully set forth in the aforementioned patent to Henderson, U.S. Pat. No. 4,596,538 whereby this U.S. Patent is being incorporated into this disclosure by reference.

Figure 2:
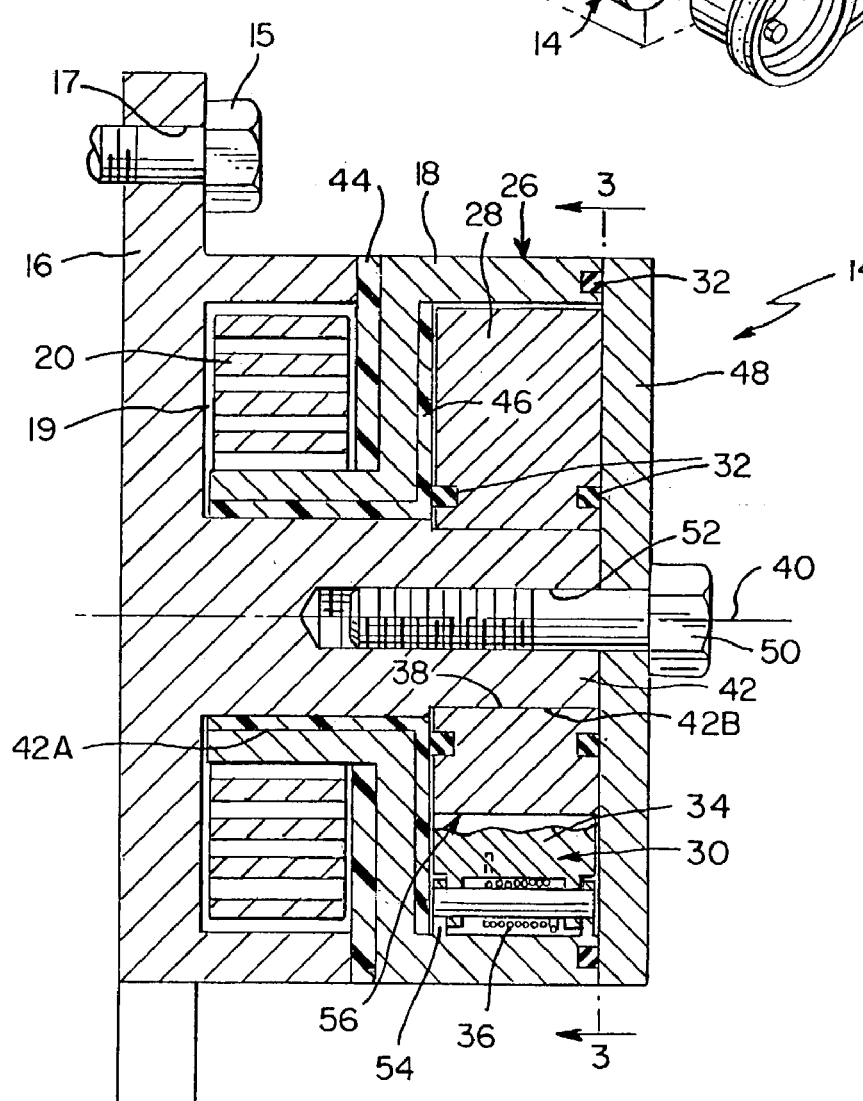
FIG. 2 is a section view of a tensioner according to one aspect.
Figure 3:
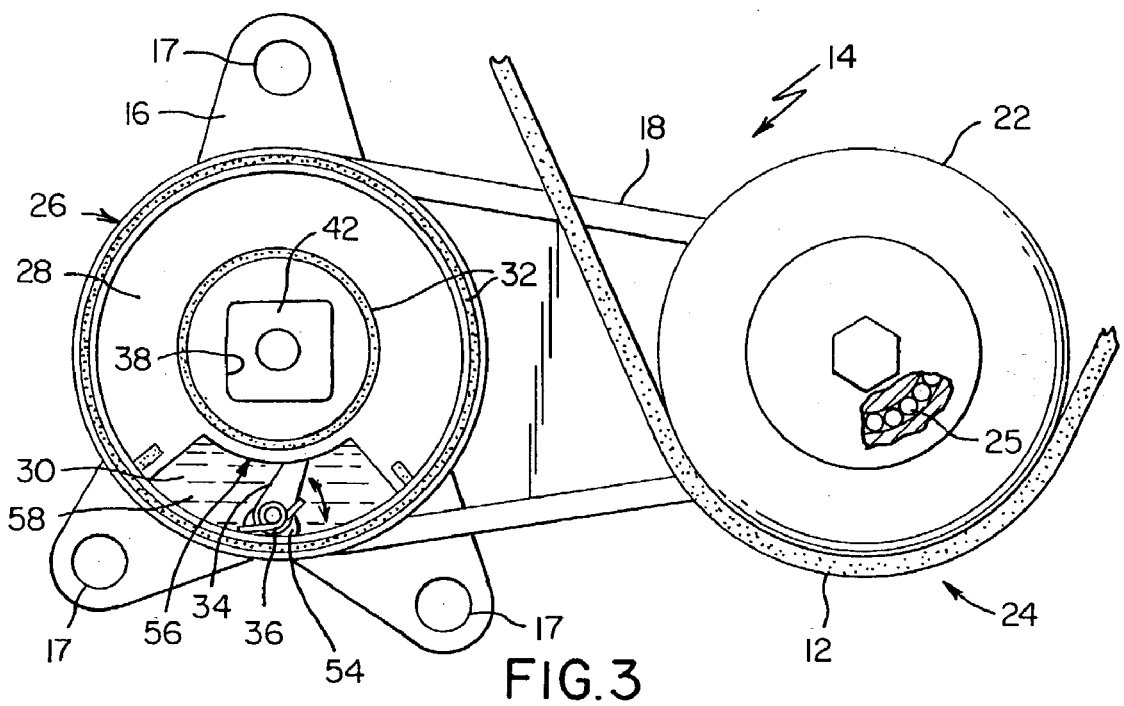
FIG. 3 is a top view of the tensioner in FIG. 2 looking into the tensioner at line 3—3 of FIG. 3.

As best illustrated in FIGS. 2–3, the tensioner 14 comprises a support member 16 formed of any suitable polymeric material, which may be configured to be fixed to a mounting bracket or support structure (not shown) of the engine 10 by any known fastening devices 15 extending through suitable apertures 17 in the support member 16 as fully set forth in the aforementioned patent to Henderson, U.S. Pat. No. 5,443,424, whereby this U.S. Patent is being incorporated into this disclosure by reference. A belt engaging arm 18 is moveably carried by the support member 16 in a manner hereinafter set forth, and may be die cast of any suitable metallic material, such as aluminum material.

The tensioner 14 further comprises a housing 19 that houses a spring 20, where the spring 20 has an inner end that is operatively interconnected to the support member 16 and an outer end that is operatively interconnected to the belt engaging arm 18. The spring 20 may comprise a substantially flat, metallic member wound in a spiral manner to define spirals or coils, where an inner spiral is adjacent the inner end and an outer spiral may be adjacent the outer end. The spring 20 is wound up in such a manner that when it is disposed in the tensioner 14, the spring 20 urges a belt engaging pulley 22 of the belt engaging arm 18 against the belt 12 to tension the same with a predetermined tension in a manner fully set forth in the above-mentioned patents. Although, a spiral flat cross section spring may be used because it takes up less space in the tensioner, as is know in the art any spring may be utilized, such as a helical coil round cross-section, compression, or tension linear spring that, while less expensive, take up more room in the housing 19 because they have a longer barrel. The belt engaging pulley 22 is rotatably mounted to an end 24 of the arm 18 by suitable bearings 25 in a manner well known in the art.

With continuing reference to FIGS. 2–3, the belt engaging arm 18 further comprises a drum section 26, which forms a cavity with the support 16. Within the cavity of the drum section 26 are a stationary chamber annulus 28, a fluid containing chamber 30 defined in the stationary chamber annulus 28, sealing devices 32, and a valve 34. The valve 34 may be a door or flat rod-like shape and is pivotally attached to the tensioner 14 so that is extends normally from the tensioner 14 and across the fluid containing chamber 30, where the valve 34 may be biased with a spring device 36. In other embodiments the valve 34 may be biased with a weight. The stationary chamber annulus 28 further comprises a elongated hole 38, centrally aligned along a longitudinal axis 40 of the tensioner 14, through which a hub 42 of the support member 16 is passed, such that the stationary chamber annulus 28 may be non-moveably secured to the hub 42. Also, the arm 18 pivots around the hub 42. The hub 42 may have a circular lower section 42A and a square upper section 42B.

Again with reference to FIGS. 2–3, the tensioner further comprises a first bearing 44 that is located between the cavity 19 and the drum section 26. Also, a second bearing 46 is located between the support member 16 and the drum section 26 and between the stationary chamber annulus 28 and the drum section 26. The tensioner further comprises a retaining plate 48 that may be secured to the hub 42 by coupling a securing device 50 into a threaded hole 52 in the hub 42. The bearings 44 and 46 may be manufactured from high grade nylon with reinforcement for compressive and shear strength, and microscopic porosity to retain grease, as manufactured by DuPont and Dow.

Again with reference to FIGS. 2–3, the valve 34 may be coupled to a portion 54 of the drum section 26. During a first operation state, maybe steady state, the tensioner arm 18 may rotate in a first direction towards the belt 12, maybe the spring unwinding direction or counter-clockwise direction. While the tensioner 14 may be moving toward the belt 12 to take up slack the tensioner 14 moves with very little resistance, maybe just bearing friction. During this state, the valve 34 is open to allow the fluid to easily flow past the valve 34. During the first state, a tension between the belt 12 and the tensioner 14 may be around 80 PSI.

In contrast, when the arm 18 travels in an opposite, second direction, maybe a spring windup or clockwise direction, a dynamic event occurs that may try to lift the tensioner 14 with the belt 12. This may be a second operation state, or non-steady state, where a reverse tension between the belt 12 and the tensioner 14 can reach 300 PSI. This event can be the unloading of an accessory, producing more tension in a slack span 60 (FIG. 1), or a rapid engine deceleration, which causes the inertia of one or more accessories to pull against an engine driver pulley through the belt 12 at a tensioner belt span 62 (FIG. 1). During this event, it may be desirable for the tensioner 14 to resist this motion with a greater torque than may be normally provided by the spring 20. Therefore, when the belt 12 tries to lift the tensioner arm, the valve 34 closes and locks against the inside surface 56 of the chamber 30, which locks the arm 18 based on the direction of fluid motion that begins to occur. Over time, a fluid 58, which may be any hydraulic fluid whose viscosity may be varied to tune the tensioner 14 or change the viscous damping coefficient, in the chamber 30 may leak past the valve 34, allowing the spring device 20 to control the belt tension. Thus, a significant amount of asymmetric, hydraulic, viscous damping torque is generated. The amount of high damping that occurs may be controlled by a size of the valve 34, where the valve 34 may be designed to fit tight in the closed state or designed with more clearance to control the amount of high damping, i.e., more clearance results in less damping. Accordingly, the greater the transient condition trying to lift the tensioner 14, the greater the arm 18 resists the motion. As soon as the dynamic event is over, the torque of the spring 20 generates sufficient motion of the arm 18 in the spring unwind direction to unlock the valve 34.

Figure 5:
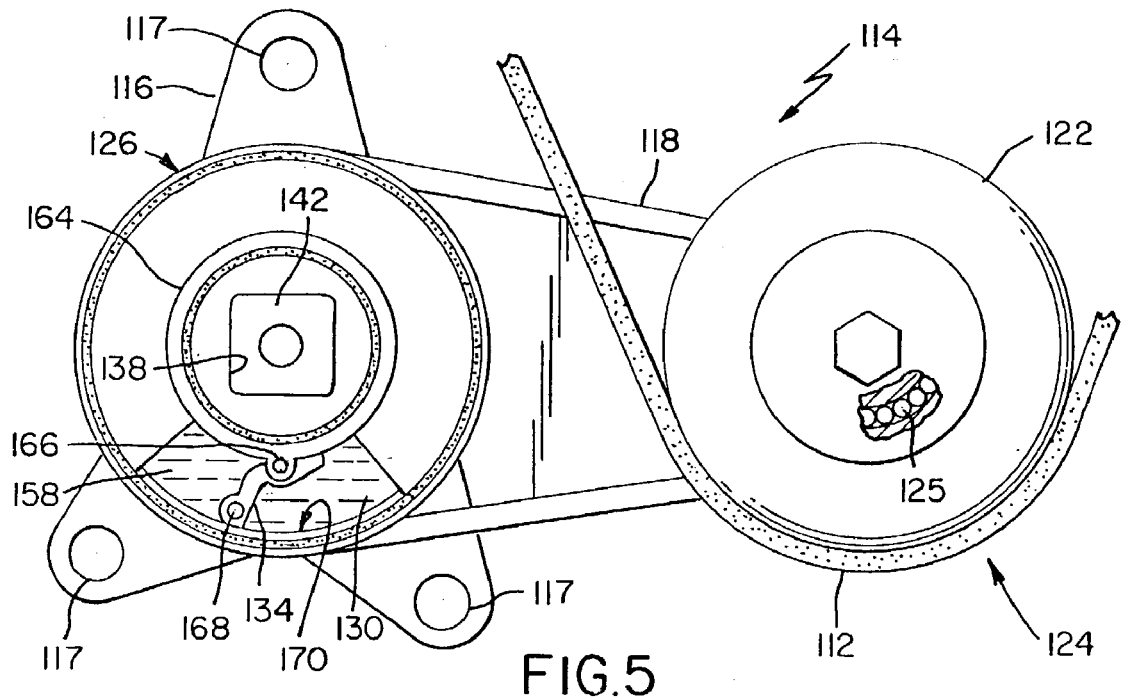
FIG. 5 is a top view of the tensioner of FIG. 4 looking into the tensioner at line 5—5 of FIG. 4.
Figure 4:
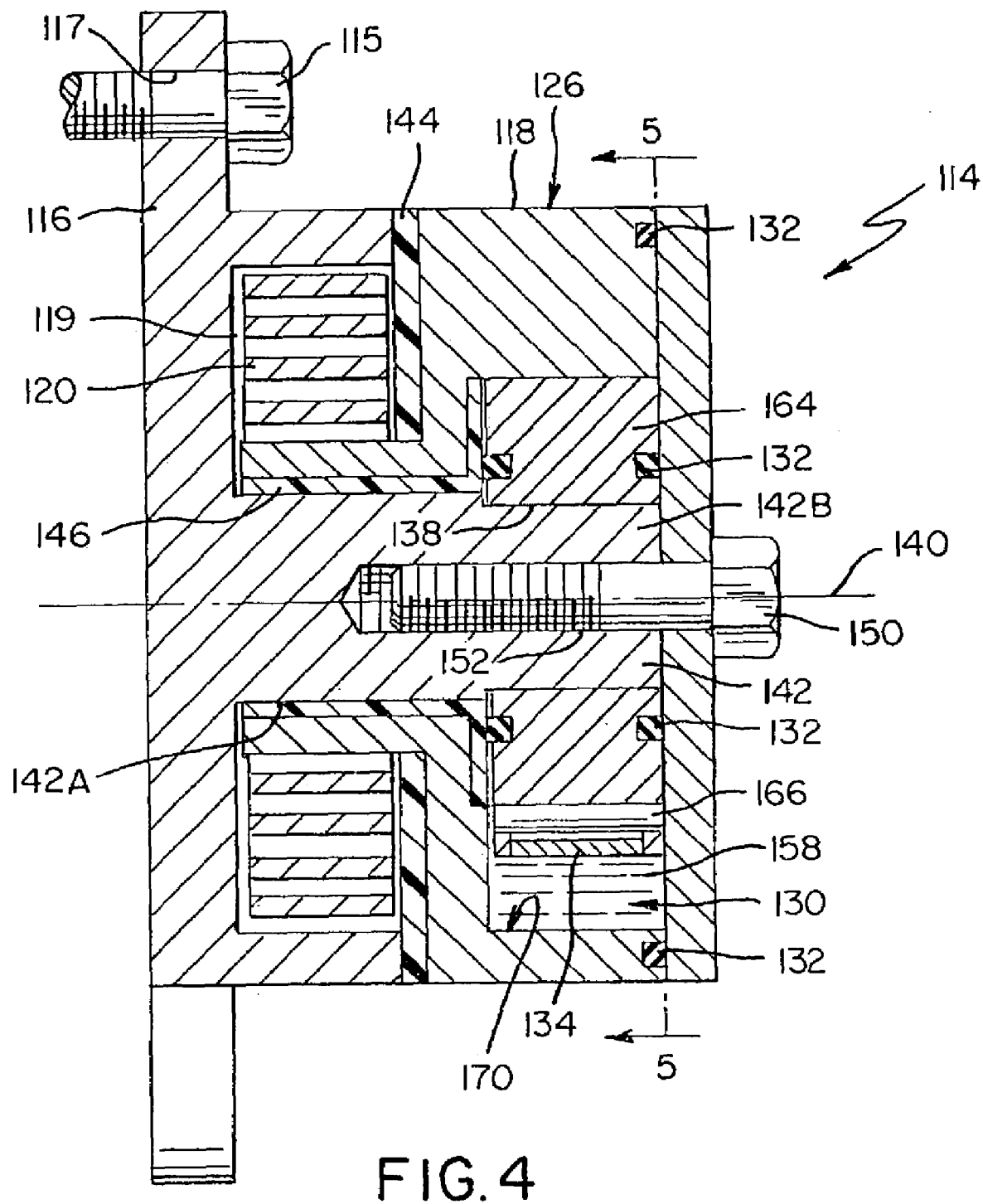
FIG. 4 is a section view of a tensioner according to a second aspect.

Turning now to FIGS. 4–5, another possible embodiment of the tensioner 114 is shown. For convenience, all similar parts have similar reference numbers, except for a 100 designation, therefore only differences between the two embodiments are discussed. The tensioner 114 comprises a stationary valve plate 164 coupled to the hub 142, which replaces the stationary chamber annulus 28 of the embodiment previously discussed. Also, the fluid filled chamber 130 is defined in a portion of the drum section 126, and not the stationary chamber annulus 28. The valve 134 is pivotally coupled to the stationary valve plate 164 via a coupling device 166. Hence, in this arrangement the chamber 130 moves with the arm 118 and the valve 134 is stationary. The chamber 130 may be at the bottom of the drum section 126 because the valve 134 is stationary. Thus, the valve 134 may be located by gravity in its closed position. In this arrangement, not much force is needed to positioned the valve 134 because any motion of the fluid 158 sets the valve 134 in either a locked open or locked shut position. Therefore, there may be no requirement for the spring 36. Although, the use of a spring 136 or a weight 168 to locate the valve 134 in it closed position may be desired.

With continuing reference to FIGS. 4–5, an operation of this embodiment will be described. During a first operation state, maybe steady state, the tensioner arm 118 rotates in a first direction towards the belt 112, maybe the spring unwinding direction or counter-clockwise direction. While the tensioner 114 may be moving toward the belt 112 to take up slack the tensioner 114 may move with very little resistance, maybe just bearing friction. During this state, the valve 34 is open to allow the fluid to easily flow past the valve 134. During the first state, a tension between the belt 112 and the tensioner 114 may be around 80 PSI.

In contrast, when the arm 118 travels in an opposite, second direction, maybe a spring windup or clockwise direction, a dynamic event occurs that may be trying to lift the tensioner 114 with the belt 112. This may be a second operation state, or non-steady state, where a reverse tension between the belt 112 and the tensioner 114 can reach 300 PSI. This event can be the unloading of an accessory, producing more tension in a slack span 60 (FIG. 1), or a rapid engine deceleration, which causes the inertia of one or more accessories to pull against an engine driver pulley through the belt 112 at a tensioner belt span 62 (FIG. 1). During this event, it may be desirable for the tensioner 114 to resist this motion with a greater torque than may be normally provided by the spring 120. Therefore, when the belt 112 tries to lift the tensioner arm, the valve 134 closes and locks against the inside surface 170 of the chamber 130, which locks the arm 118 based on the direction of fluid motion that beings to occur. Over time, a fluid 158, which may be any hydraulic fluid whose viscosity may be varied to tune the tensioner 114 or change the viscous damping coefficient, in the chamber 130 may leak past the valve 134, allowing the spring device 120 to control the belt tension. Thus, a significant amount of asymmetric, hydraulic, viscous damping torque may be generated. The amount of high damping that occurs may be controlled by a size of the valve 134, where the valve 134 may be designed to fit tight in the closed state or designed with more clearance to control the amount of high damping, i.e., more clearance results in less damping. Accordingly, the greater the transient condition trying to lift the tensioner 114, the greater the arm 118 resists the motion. As soon as the dynamic event is over, the torque of the spring 120 generates sufficient motion of the arm 118 in the spring unwind direction to unlock the valve 134.

The tensioner is unidirectional, as described above, because the rotational motion of the locking of the door 34 or 134 is counter clockwise only. Also, the asymmetrical damping may be accomplished through to allow the damping to be higher when the belt 12/112 tries to lift the tensioner 14/114 than when the tensioner 14/114 moves with the belt 12/112. Essentially, there may be no damping when the tensioner 14/114 moves toward the belt 12/112. It is to be appreciated that the spring windup direction may be either clockwise or counterclockwise, as can be the spring unwinding direction. This would be accomplished by using a mirror image tensioner.

Figure 6:
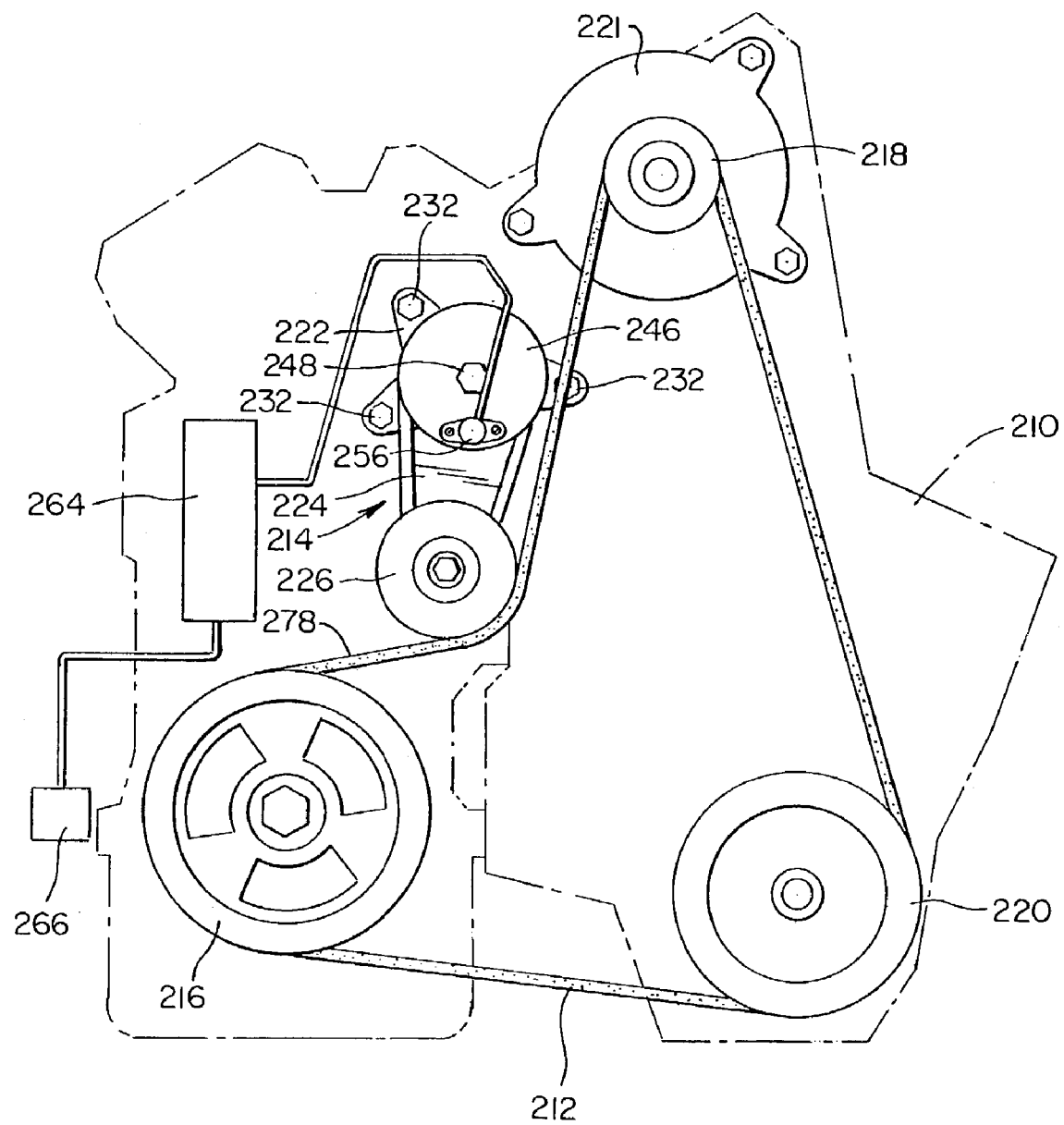
FIG. 6 is a front view of a section of an engine having a tensioner according to a third aspect that may be used to generate tension in a power-transmitting belt.

FIG. 6 illustrates a front end of an engine 210, which may be an automobile engine. The engine utilizes an endless power-transmitting belt 212 for driving at least one driven accessory and a tensioner 214 for generating and maintaining tension in the belt 212. The belt 212 may be driven by a first sheave 216 during normal operating conditions and may drive, thereby supplying power to, one or more driven sheaves that are operatively connected to one or more accessories. In FIG. 6, for example, the belt 212 is used to drive a second sheave 218 and a third sheave 220. The first sheave 216 may be operatively connected to the crankshaft (not shown), which is driven by the engine 210. The second sheave 218 may be operatively connected to an alternator/starter device 221. The third sheave 220 may be operatively connected to a power steering device (not shown). The driven accessories, through their sheaves, may impose a load on the belt 212.

Figure 7:
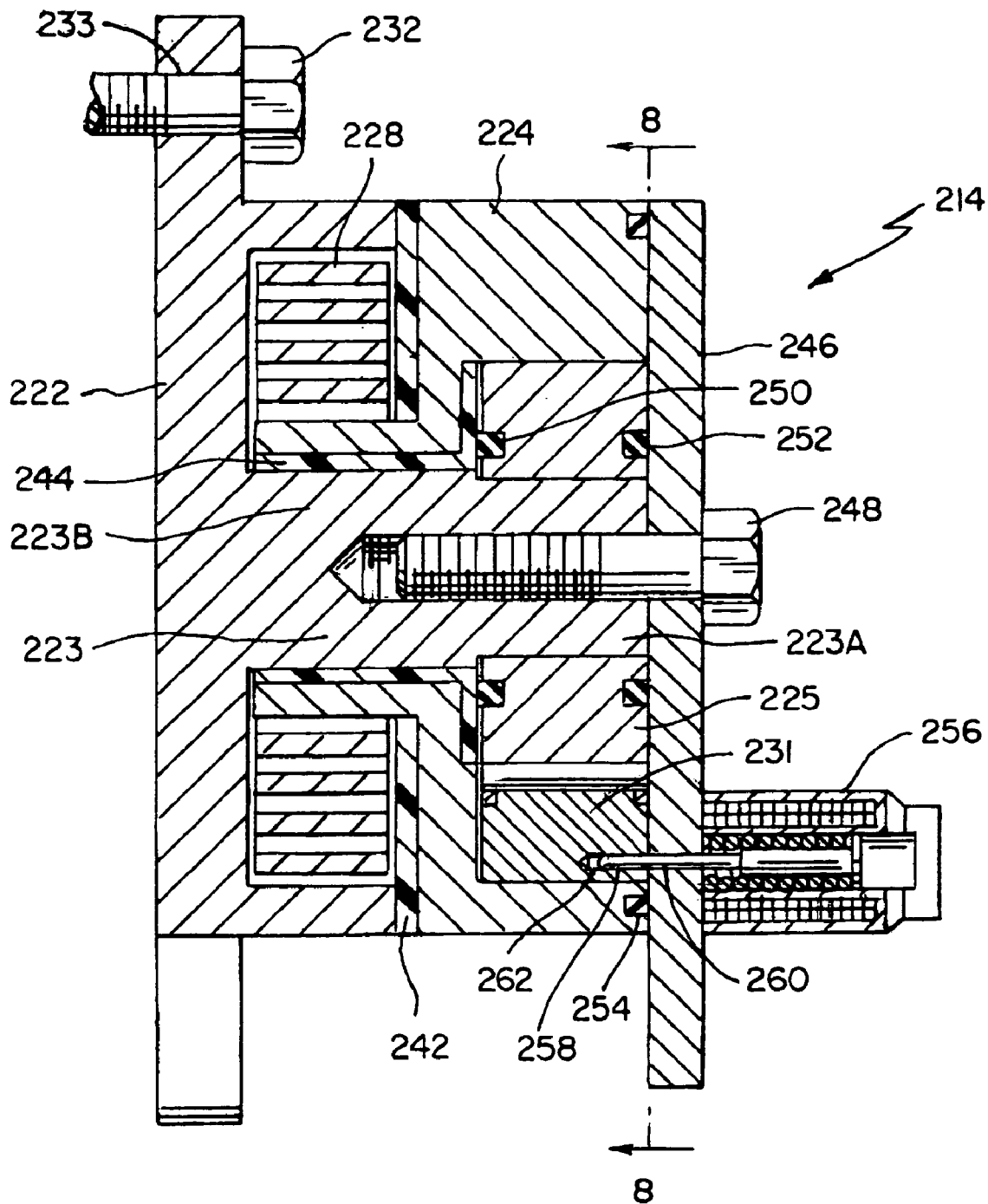
FIG. 7 is a section view of the tensioner of FIG. 6.
Figure 8:
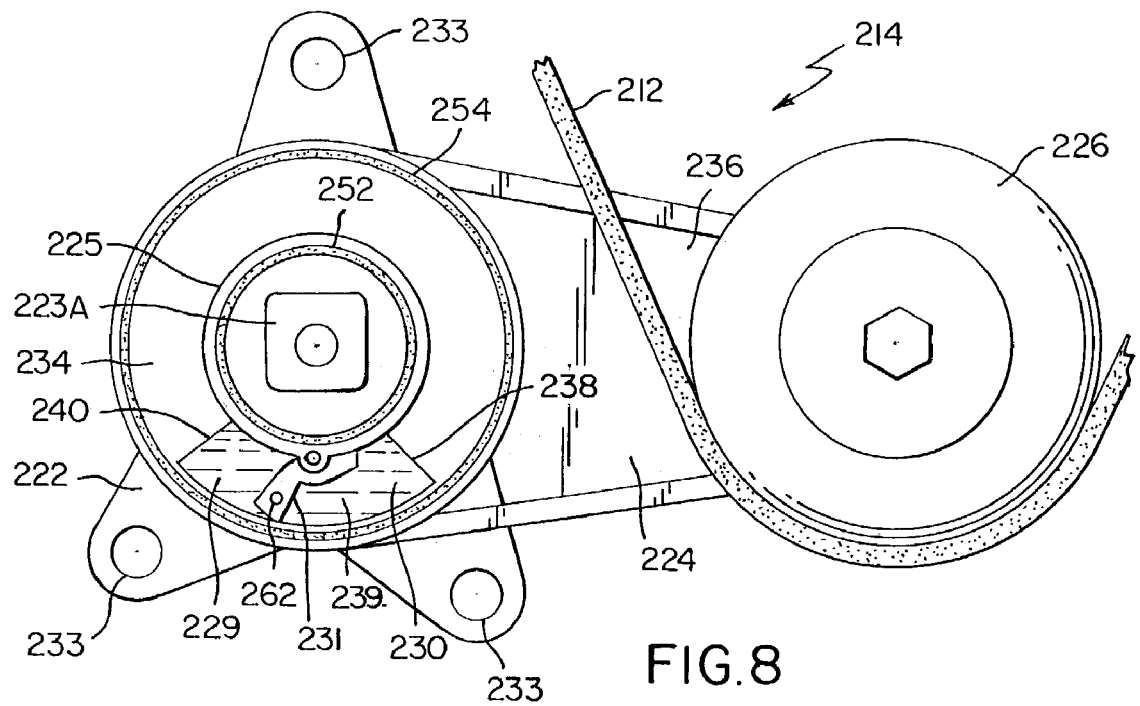
FIG. 8 is a top view of the tensioner of FIG. 7 looking into the tensioner at line 8—8 of FIG. 7.

Referring to FIGS. 7 and 8, the tensioner 214 includes a base 222, an arm 224 that is pivotably attached to the base 222, a pulley 226 that is rotatably attached to the arm 224 for engaging the belt 212, a spring 228 that is operatively connected to the arm 224 and the base 222 for urging the arm 224 to pivot relative to the base 222 in a first direction, toward the belt 212 (which is clockwise in FIG. 8), and an asymmetric fluid damper 229 which is comprised of a fluid containing chamber 230 and a valve 231. When the arm 224 is pivoted toward the belt 212 by the spring 228, the pulley 226 is thereby urged into engagement with the belt 212 with a force to tension the belt 212.

The base 222 may be secured to the engine 210 or a support structure (not shown) of the engine 210 in a desired position relative to the first sheave 216 and the second sheave 218 with bolts 232 or other fasteners that extend through apertures 233 in the base 222. Specifically, the base 222 may be secured in a position such that the tensioner 214 may tension the belt 212 in a span located between the first sheave 216 and the second sheave 218, also referred to here as the "slack span" 278.

The arm 224 is attached to the base 222 for pivotable movement about a hub 223 of the base 222. As shown in FIG. 8, the arm 224 may be attached to the base 222 at a first end 234 of the arm 224 and the pulley 226 may be rotatably attached to a second end 236 of the arm 224. Accordingly, as the arm 224 is pivoted on the base 222 by the spring 228, the pulley 226 may engage the belt 212 with a force to tension the belt 212.

The spring 228, which may be a spiral spring, may be positioned about the hub 223 of the base 222 and is operatively connected to the base 222 and the arm 224 for urging the arm 224 to pivot relative to the base 222. Specifically, the spring 228 may be wound up such that when the spring 228 is connected to the arm 224 and the base 222 the unwinding of the spring 228 causes the arm 224 to pivot toward the belt 212.

The asymmetric fluid damper 229 includes a fluid containing chamber 230 and a valve 231. The fluid containing chamber 230 is located between the base 222 and the arm 224 such that the chamber 230 moves with the arm 224 relative to the base 222. The valve 231, which may be similar to a swinging door, is pivotably attached to the base 222 for pivotable movement within the fluid containing chamber 230 between an open position and a closed position. The valve 231 may be biased toward the closed position (shown in FIG. 8) using either a weight or a spring.

Referring to FIG. 8, when the arm 224 moves in the first direction, toward the belt 212 (clockwise in FIG. 8), a first wall 238 of the arm 224 may act like a piston causing the fluid 239 in the chamber 230 to move with the arm 224 about the hub 223, thereby causing the valve 231 to pivot to the open position. When the arm 224 moves in the second direction, away from the belt 212, a second wall 240 of the arm 224 may act like a piston causing the fluid 239 in the chamber 230 to move with the arm 224, thereby causing the valve 231 to pivot to the closed position or be held in the closed position. In the open position the valve 231 provides a minimum amount of resistance to fluid flow from one side of the valve 231 to the other. In the closed position, the valve 231 is positioned in the fluid containing chamber 230 to provide greater restriction of fluid flow than when the valve is in the open position. Accordingly, the asymmetric fluid damper 229 provides greater resistance to movement of the arm 224 in the second direction, away from the belt 212, than to movement of the arm 224 in the first direction.

A clearance may be provided between the valve 231 and the walls of the chamber 230 even when the valve 231 is in the closed position such that over time the fluid 239 will leak past the valve 231, thereby allowing the spring 228 to control the belt tension. The amount of viscous damping that is provided by the asymmetric fluid damper 229 may be controlled by sizing the valve 231 or changing the viscosity of the fluid 239. Specifically, the valve 231 can be designed to fit tightly when in the closed position or designed with more clearance to provide less damping.

The base 222 may include a valve plate 225 to which the valve 231 is pivotably attached. The valve plate 225 may be non-rotatably attached on the hub 223 of the base 222 to prevent rotation of the valve plate 225 and valve 231 with the arm 224 about the hub 223. To prevent rotation of the valve plate 225, an upper portion 223A of the hub 223 may have a non-circular shape such as a square and a corresponding opening in the valve plate 225 may be shaped to fit on the upper portion 223A of the hub 223. A lower portion 223B of the hub 223 may be circular.

Referring to FIG. 7, the tensioner 214 may include a first bearing 242 that is positioned between spring 228 and the arm 224 and a second bearing 244 that is positioned between the hub 223 and the arm 224 and the valve plate 225 and the arm 224. The first and second bearings 242, 244 may be made of high grade nylon or similar material to permit low friction movement of the various elements relative to one another. The tensioner 214 may also include a retaining plate 246 for holding the spring 228, the arm 224, and the valve plate 225 onto the hub 223 of the base 222. The retaining plate 246 may be secured to the hub 223 of the base 222 with a threaded bolt 248 or other fastener. To prevent the fluid 239 from leaking out of the chamber 230 as the arm 224 moves, the tensioner 214 may also include several O-rings 250, 252, 254. A first O-ring 250 may be located between the valve plate 225 and the second bearing 244. A second O-ring 252 may be located between the valve plate 225 and the retaining plate 246. A third O-ring 254 may be located between the arm 224 and the retaining plate 246.

In another aspect, the tensioner 214 may include a solenoid 256 for locking the valve 231 in the closed position. The solenoid 256 includes a plunger 258 that is movable between a retracted position and an extended position. In the extended position the plunger 258 engages the valve 231 to lock the valve 231 in the closed position, thereby resisting movement of the arm 224 in the first and second directions.

Referring to FIG. 8, the solenoid 256 may be attached to the retaining plate 246 on the exterior of the tensioner 214. The plunger 258 may extend through an aperture 260 in the retaining plate 246 and into the chamber 230 to lock the valve 231 when the plunger 258 is in the extended position. Specifically, the valve 231 may include a recess 262 for receiving the plunger 258 when the valve 231 is in the closed position such that the recess 262 and the plunger 258 are aligned.

In another aspect the tensioner 214 may include a sensor 266 for obtaining a condition of the engine 210 and a controller 264. The controller 264 may be the engine's 210 computer. The sensor 266 may be an existing engine rotation magnetic sensor in the engine 210 that is already used to measure the revolutions per minute ("rpm") of the engine 210. The controller 264 may be operatively coupled to the sensor 266 for receiving a signal therefrom and may be operable to move the plunger 258 of the solenoid 256 between the retracted and extended positions based, as least in part, on the signal received from the sensor 266. The controller 264 may be programmed to extend the plunger 258, thereby locking the valve 231, during preselected operating conditions of the engine 210 which may be defined by the engine speed as measured by the sensor 266. Accordingly, at a first engine speed at which it may be desirable to restrict the movement of the arm 224 in both the first direction and the second direction the controller 264 may activate the solenoid 256 thereby extending the plunger 258 and locking the valve 231 in the closed position. By contrast, at a second engine speed at which it may be desirable to permit free movement of the arm 224 in the first direction to tension the "slack span" 278 of the belt 212 the controller 264 may deactivate the solenoid 256 thereby moving the plunger 258 to the retracted position. In addition, the controller 264 may be programmed to extend the plunger 258 based upon engine conditions other than engine speed.

Figure 10:
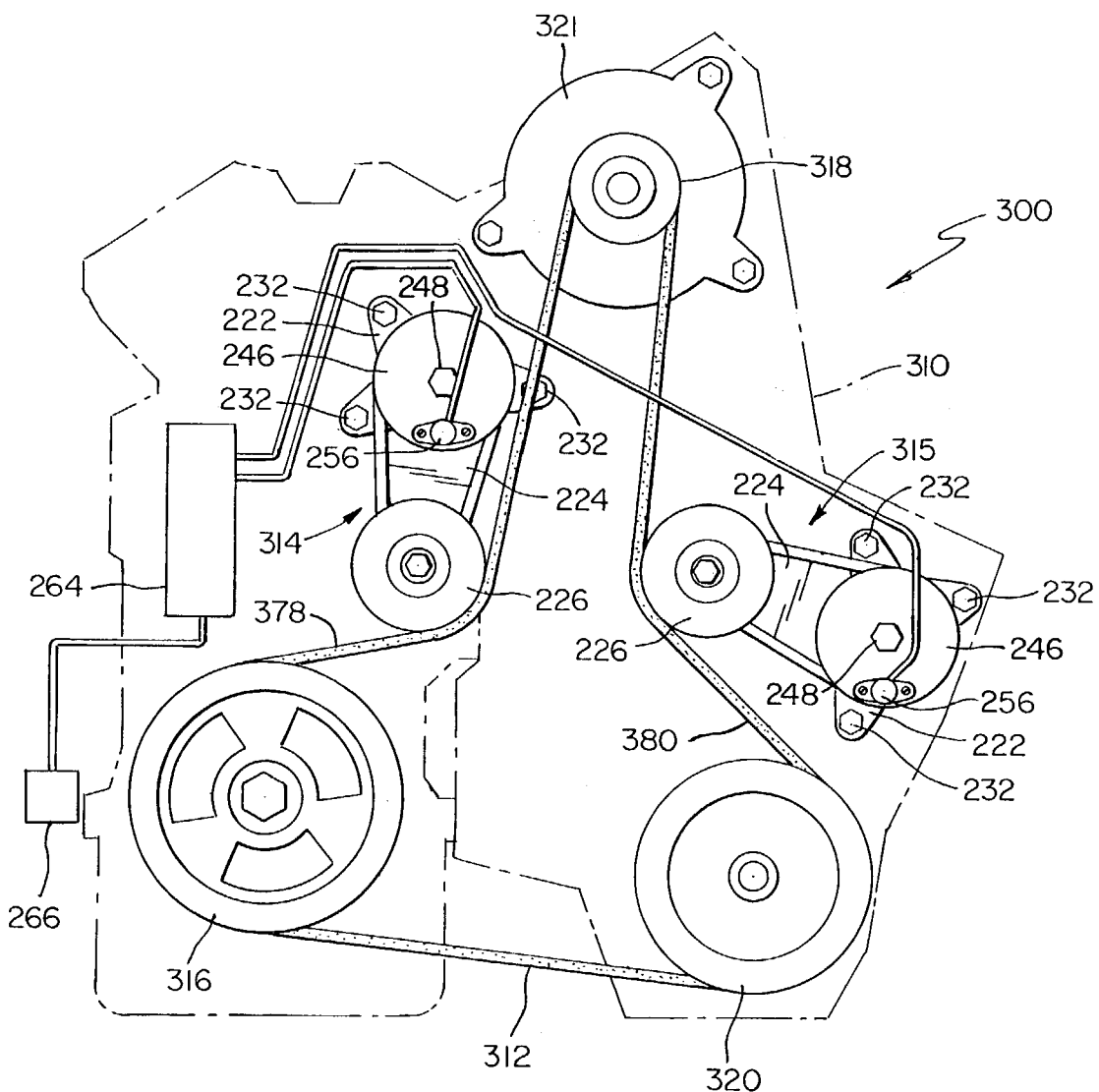
FIG. 10 is a front view of a section of an engine having a tensioner system according to one aspect that may be used to generate tension in a power-transmitting belt.

Referring to FIG. 10, in another aspect a tensioner system 300 is provided which is used to generate tension in a power-transmitting belt 312 as the belt 312 traverses a first sheave 316 and a second sheave 318 of an automobile engine 310. The belt 312 may be driven by the first sheave 316 during normal operating conditions and may drive, thereby supplying power to, one or more driven sheaves that are operatively connected to one or more accessories. In FIG. 10, for example, the belt 312 is used to drive the second sheave 318 and a third sheave 320. The first sheave 316 may be operatively connected to the crankshaft (not shown), which is driven by the engine 310. The second sheave 318 may be operatively connected to an alternator/starter device 321. The third sheave 320 may be operatively connected to a power steering device (not shown).

Figure 9:
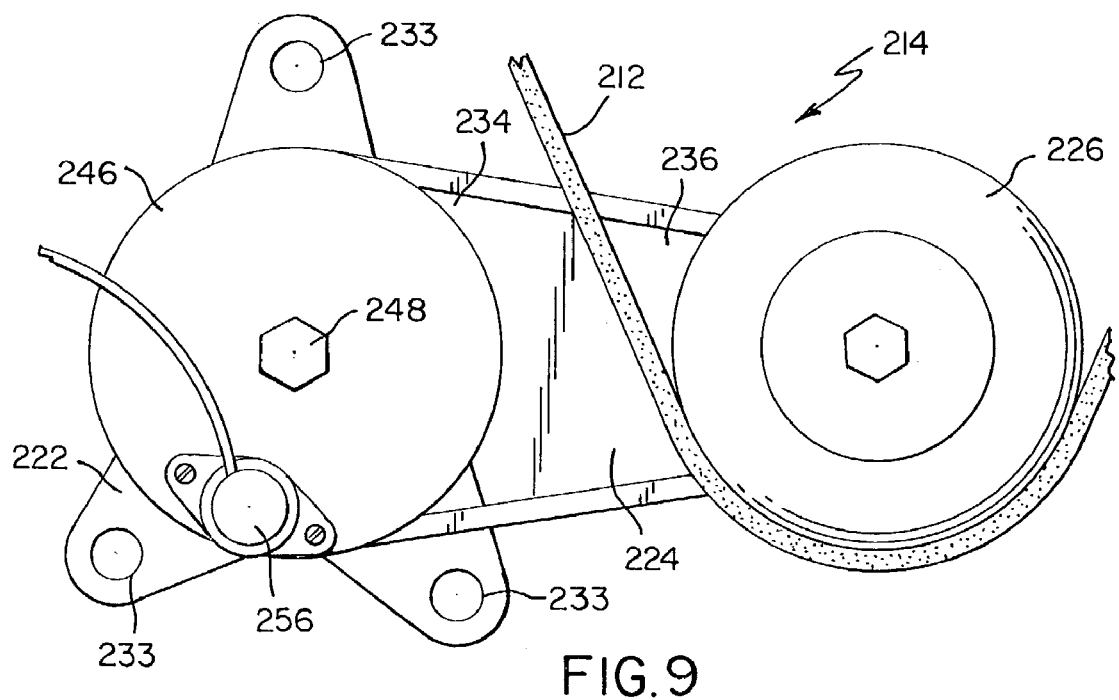
FIG. 9 is a top view of the tensioner of FIG. 7.

The tensioner system 300 includes a first tensioner 314 for tensioning a first span 378 of the belt 312, a second tensioner 315 for tensioning a second span 380 of the belt 312, a sensor 266 for obtaining a condition of the automobile engine 310, and a controller 264. The first and second tensioners 314, 315 are similar to the tensioner 214 illustrated in FIGS. 7, 8, and 9, although the orientation of the elements of the first and second tensioners 314, 315 may differ from that shown. Accordingly, when describing the structure and operation of the first and second tensioners 314, 315 in FIG. 10, the reference numbers of FIGS. 7, 8, and 9 that correspond to similar structure will be used.

The first and second tensioners 314, 315 of the tensioner system 300 each include a base 222, an arm 224 that is pivotably attached to the base 222, and a pulley 226 that is rotatably attached to the arm 224 for engaging the belt 312. The pulley 226 of the first tensioner 314 engages a first span 378 of the belt 312 located between the first sheave 316 and the second sheave 318. The pulley 226 of the second tensioner 315 engages a second span 380 of the belt 312 which may be located between the second sheave 318 and a third sheave 320. Both of the tensioners 314, 315 also include a spring 228 that is operatively coupled to the arm 224 and the base 222 for urging the arm 224 to pivot in a direction toward the belt 312, thereby urging the pulley 226 into engagement with the belt 312 with a force to tension the belt 312.

The first and second tensioners 314, 315 further include an asymmetric fluid damper 229 comprising a fluid containing chamber 230 and a valve 231 The fluid containing chamber 230 is located between the base 222 and the arm 224 such that the chamber 230 moves with the arm 224 relative to the base 222. The valve 231 is pivotably attached to the base 222 SO as to be pivotable between an open position and a closed position. When the arm 224 moves in the direction toward the belt 312 the flow of fluid in the chamber 230 pivots the valve 231 to the open position. When the arm moves in a direction away from the belt 312 the flow of the fluid in the chamber 230 may pivot the valve 231 to the closed position or hold the valve 231 in the closed position. In the closed position the valve 231 is positioned in the fluid containing chamber 230 to restrict fluid flow, thereby resisting movement of the arm 224 in the direction away from the belt 312. In addition, the tensioners 314, 315 include a solenoid 256 having a plunger 258 movable between a retracted position and an extended position. When in the extended position the plunger 258 engages the valve 231 to lock the valve 231 in the closed position, thereby resisting movement of the arm 224 in both directions.

The controller 264 is operatively coupled to the sensor 266 for receiving a signal therefrom and is operable to move the plungers 258 of the tensioners 314, 315 between the retracted positions and the extended positions, based, at least in part, on the signal received from the sensor 266. The sensor 266 may be an existing engine rotation magnetic sensor in the engine 310 that is already used to measure the revolutions per minute ("rpm") of the engine 310. The controller 264 may be the engine's 310 computer.

The controller 264 may be programmed to extend one or both of the plungers 258, thereby locking one or both of the valves 231 of the first and second tensioners 314, 315, during preselected operating conditions of the engine 310. Specifically, during certain operating conditions it may be desirable to lock the valve 231 of the first tensioner 314 and unlock the valve 231 of the second tensioner 316. The operating conditions of the engine 310 may be defined by the engine speed as measured by the sensor 266. In addition, the operating conditions may also be defined, at least in part, by the rate of change of the engine speed which is also obtainable from the typical engine speed sensor.

The operation of the disclosed tensioner system 300 during several typical engine conditions is described herein for purposes of illustration. The engine conditions which are considered include "cranking," "start to idle," "normal," and "1–2 shift." These conditions do not represent an exhaustive list of all operating conditions of an automobile engine.

During a first operating condition, which may be referred to as "cranking," the alternator/starter 321, which is operatively connected to the second sheave 318, may drive the belt 312. In other words, "cranking" refers to the condition before the engine 310 fires when the alternator/starter 321 drives the belt 312 and thereby supplies power to the other sheaves 316, 320. Once the engine 310 fires, the engine speed rapidly increases and the first sheave 316, which is operatively connected to the crankshaft (not shown), drives the belt 312.

"Cranking" may occur at an engine speed from 0 rpm to approximately 200 rpm. Specifically, the engine speed at the upper limit of the "cranking" condition should be selected to correspond to the engine speed at which the engine 310 fires. However, the engine speed at which the engine fires may change depending upon variables such as temperature. Accordingly, it may be desirable to define the upper limit of the "cranking" condition using a rate of change of the engine speed rather than an absolute engine speed. When the engine 310 fires, the engine speed will increase rapidly. Therefore, when a sudden increase in engine speed is detected around 200 rpm the "cranking" condition may be determined to be over. The rate of change of the engine speed may be obtained using the same sensor 266 that is used to obtain absolute engine speed.

Referring to FIG. 10, during the "cranking" condition, the second sheave 318, which drives the belt 312, turns in a desired direction, which is clockwise in FIG. 10. As a result of loads imposed by the sheaves 316, 318, 320 on the belt 312, the tension in the first span 378 of the belt 312 will be high during "cranking" and the tension in the second span 380 of the belt 312 will decrease. Under these conditions, in order to maintain tension in the belt 312, the first tensioner 314 should be operable to resist lifting by the belt 312 in the first span 378 and the second tensioner 315 should be operable to take up slack in the second span 380 of the belt 312.

Accordingly, when the controller 264 determines that the engine 310 is in the "cranking" condition, based, at least in part, on the signal received from the sensor 266, the controller 264 may activate the solenoid 256 of the first tensioner 314 to extend the plunger 258 and thereby lock the valve 231 of the first tensioner 314. In addition, the controller 264 may deactivate the solenoid 256 of the second tensioner 315 during "cranking" to retract the plunger 258 and thereby unlock the valve 231 of the second tensioner 315. When the valve 231 of the first tensioner 314 is locked, the fluid damper 229 restricts the movement of the arm 224 in both directions. When the valve 231 of the second tensioner 315 is unlocked, the arm 224 of the second tensioner 315 is free to move in the direction toward the belt 312 and thereby tension the belt 312 in the second span 380.

In a second operating condition, referred to here as "start to idle," the engine 310 fires such that the first sheave 316 begins to drive the belt 312 and the engine speed increases up to the idle speed of the engine 310. Specifically, the "start to idle" condition may occur during engine speeds above the "cranking" condition from approximately 200 rpm to approximately 900 rpm. The upper limit of the "start to idle" condition should be selected to correspond to the engine speed at which the engine 310 idles, which is usually in the range of 600 rpm to 1100 rpm depending upon external variables such as temperature. As previously described, the dividing line between the "cranking" condition and the "start to idle" condition may be determined using a rate of change of the engine speed rather than an absolute engine speed since the engine speed at which the engine fires in not constant. Likewise, the upper limit of the "start to idle" condition may be determined using a rate of change of the engine speed rather than an absolute engine speed since the engine speed at idle may vary depending upon temperature.

Referring to FIG. 10, during the "start to idle" condition, the first sheave 316, which is coupled to the crankshaft (not shown), drives the belt 312 in a direction which is clockwise in FIG. 10. Accordingly, the tension in the span of belt located between the first sheave 316 and the third sheave 320 is high during this operating condition and the tension in the first span 378 will decrease. Ordinarily, if the tension in the first span 378 of the belt 312 is decreasing, it would be desirable to unlock the valve 231 of the first tensioner 314 so that the arm 224 of the first tensioner 314 is free to move toward the belt 312 to tension the first span 378. However, because engines are frequently designed so that their first resonance point occurs at an engine speed below idle, it may be desirable to lock the tensioners 314, 315 during any resonant condition to provide maximum damping.

Accordingly, when the controller 264 determines that the engine 310 is in the "start to idle" condition, based, at least in part, on the signal received from the sensor 266, the controller 264 may activate the solenoids 256 of the first and second tensioners 314, 315 to extend the plungers 258 and thereby lock the valves 231 of the first and second tensioners 314, 315. When the valves 231 of the tensioners 314, 315 are locked, the fluid dampers 229 restrict the movement of the arms 224 in both directions and thus limit resonant vibrations.

In a third operating condition, referred to here as the "normal" operating condition, the first sheave 316 drives the belt 312 at a range of engine speeds above idle. Specifically, the "normal" operating condition may occur at engine speeds from approximately 900 rpm (the estimated idle speed) to approximately 4000 rpm. A hysteresis may be used to prevent an electromechanical resonant vibration near the dividing line between the "normal" condition and the "start to idle" condition.

Referring to FIG. 10, during the "normal" condition, the first sheave 316, which is coupled to the crankshaft (not shown), drives the belt 312 in a direction which is clockwise in FIG. 10. Accordingly, the tension in the span of belt located between the first sheave 316 and the third sheave 320 is high during this operating condition and the tension in the first span 378 will decrease. Under such conditions it may be desirable to unlock the valve 231 of the first tensioner 314 so that the arm 224 of the first tensioner 314 is free to move toward the belt 312 to tension the first span 378.

When the controller 264 determines that the engine 310 is in the "normal" condition, based, at least in part, on the signal received from the sensor 266, the controller 264 may deactivate the solenoid 256 of the first tensioner 314 to retract the plunger 258 and thereby unlock the valve 231 of the first tensioner 314. When the valve 231 of the first tensioner 314 is unlocked, the arm 224 of the first tensioner 314 is free to move in the direction toward the belt 312 and thereby tension the belt 312 in the first span 378. In addition, the controller may activate the solenoid 256 of the second tensioner 315 to extend the plunger 258 and thereby lock the valve 231 of the second tensioner 315. When the valve 231 of the second tensioner 315 is locked, the fluid damper 229 restricts the movement of the arm 224 in both directions. This may be desirable during the "normal" condition to reduce any resonant effect resulting from the changing loads on the second and third sheaves 318, 320 which are attached to automobile accessories.

In a fourth operating condition, referred to here as "1–2 shift," the crankshaft (not shown) rapidly decelerates as a result of the engine transmission shifting from first to second gear. Accordingly, as a result of the high rotational inertia of the alternator/starter 321, which is connected to the second sheave 318 in FIG. 10, the second sheave 318, rather than the first sheave 316, drives the belt 312 temporarily during the transient event. The "1–2 shift" condition may occur at engine speeds above the "normal" condition at approximately 4000 rpm.

Referring to FIG. 10, during the "1–2 shift" condition, the second sheave 318, which rotates clockwise in FIG. 10, will pull the belt 312 tight in the first span 378 between the rapidly rotating second sheave 318 and the slower rotating first sheave 316. A corresponding decrease in the tension of the second span 380 of the belt 312 will also occur during the transient event. Under these conditions, in order to maintain tension in the belt 312, the first tensioner 314 should be operable to resist lifting by the belt 312 in the first span 378 and the second tensioner 315 should be operable to take up slack in the second span 380 of the belt 312.

Accordingly, when the controller 264 determines that the engine 310 is in the "1–2 shift" condition, based, at least in part, on the signal received from the sensor 266, the controller 264 may activate the solenoid 256 of the first tensioner 314 to extend the plunger 258 and thereby lock the valve 231 of the first tensioner 314. In addition, the controller 264 may deactivate the solenoid 256 of the second tensioner 315 during the "1–2 shift" to retract the plunger 258 and thereby unlock the valve 231 of the second tensioner 315. When the valve 231 of the first tensioner 314 is locked, the fluid damper 229 restricts the movement of the arm 224 in both directions. When the valve 231 of the second tensioner 315 is unlocked, the arm 224 of the second tensioner 315 is free to move in the direction toward the belt 312 and thereby tension the belt 312 in the second span 380.

The embodiments have been described in detail with respect to specific embodiments thereof, but it will be apparent that numerous variations and modifications are possible without departing from the spirit and scope of the embodiments as defined by the following claims.

What is claimed is:

1. A tensioner for generating tension in a power-transmitting belt as the belt traverses a first sheave and a second sheave, the tensioner comprising:
   a base;
   an arm pivotably attached to the base;
   a pulley rotatably attached to the arm for engaging the belt;
   a spring operatively connected to the arm and the base for urging the arm to pivot relative to the base in a first direction, thereby urging the pulley into engagement with the belt with a force to tension the belt; and
   an asymmetric fluid damper comprising a fluid containing chamber located between the base and the arm, the chamber moving with the arm relative to the base, and a valve pivotably attached to the base and pivotable between an open position and a closed position, the valve pivoting to the open position when the arm moves in the first direction and pivoting to the closed position when the arm moves in a second direction, the valve positioned in the fluid containing chamber to restrict fluid flow when in the closed position, thereby resisting movement of the arm in the second direction; wherein the valve is biased toward the closed position; and further comprising a solenoid having a plunger movable between a retracted position and an extended position, the plunger engaging the valve to lock the valve in the closed position when in the extended position, thereby resisting movement of the arm in the first and second directions.

2. The tensioner of claim 1 wherein the valve includes a recess for receiving the plunger.

3. The tensioner of claim 2 wherein the recess in the valve is aligned with the plunger to receive the plunger only when the valve is in the closed position.

4. The tensioner of claim 1 for use with an automobile engine, the tensioner further comprising:
   a sensor for obtaining a condition of the engine; and
   a controller operatively coupled to the sensor for receiving a signal therefrom, the controller operable to move the solenoid plunger between the retracted and extended positions based, at least in part, on the signal received from the sensor.

5. The tensioner of claim 4 wherein the sensor is an engine speed sensor.

6. A tensioner system for generating tension in a power-transmitting belt as the belt traverses a first sheave and a second sheave of an automobile engine, the tensioner system comprising:
   a first tensioner having a base, an arm pivotably attached to the base, a pulley rotatably attached to the arm for engaging a first span of the belt located between the first sheave and the second sheave, a spring operatively coupled to the arm and the base for urging the arm to pivot in a direction toward the belt, thereby urging the pulley into engagement with the first span of the belt with a force to tension the belt, an asymmetric fluid damper comprising a fluid containing chamber located between the base and the arm, the chamber moving with the arm relative to the base, and a valve pivotably attached to the base and pivotable between an open position and a closed position, the valve pivoting to the open position when the arm moves in the direction toward the belt and pivoting to the closed position when the arm moves in a direction away from the belt, the valve positioned in the fluid containing chamber to restrict fluid flow when in the closed position, thereby resisting movement of the arm in the direction away from the belt, and a solenoid having a plunger movable between a retracted position and an extended position, the plunger engaging the valve to lock the valve in the closed position when in the extended position, thereby resisting movement of the arm in both directions;

a second tensioner having a base, an arm pivotably attached to the base, a pulley rotatably attached to the arm for engaging a second span of the belt, a spring operatively coupled to the arm and the base for urging the arm to pivot in a direction toward the belt, thereby urging the pulley into engagement with the second span of the belt with a force to tension the belt, an asymmetric fluid damper comprising a fluid containing chamber located between the base and the arm, the chamber moving with the arm relative to the base, and a valve pivotably attached to the base and pivotable between an open position and a closed position, the valve pivoting to the open position when the arm moves in the direction toward the belt and pivoting to the closed position when the arm moves in a direction away from the belt, the valve positioned in the fluid containing chamber to restrict fluid flow when in the closed position, thereby resisting movement of the arm in the direction away from the belt, and a solenoid having a plunger movable between a retracted position and an extended position, the plunger engaging the valve to lock the valve in the closed position when in the extended position, thereby resisting movement of the arm in both directions;

a sensor for obtaining a condition of the engine; and a controller operatively coupled to the sensor for receiving a signal therefrom, the controller operable to independently move the plunger of the first tensioner and the plunger of the second tensioner, respectively, between the retracted positions and the extended positions, based, at least in part, on the signal received from the sensor.

7. The tensioner system of claim 6 wherein the sensor is an engine speed sensor.

8. The tensioner system of claim 7 wherein the tensioner system is operable in at least three operating conditions including a first operating condition in which the plunger of the first tensioner is in the extended position thereby locking the valve of the first tensioner in the closed position and the plunger of the second tensioner is in the retracted position thereby permitting the valve of the second tensioner to pivot;

a second operating condition in which the plungers of the first tensioner and the second tensioner are in the extended position thereby locking the valves of the first tensioner and the second tensioner in the closed position; and a third operating condition in which the plunger of the first tensioner is in the retracted position thereby permitting the valve of the first tensioner to pivot and the plunger of the second tensioner is in the extended position thereby locking the valve of the second tensioner in the closed position.

9. The tensioner system of claim 8 wherein the tensioner system operates in the first condition when the sensor detects an engine speed in a first range, in the second condition when the sensor detects an engine speed in a second range, and in the third condition when the sensor detects an engine speed in a third range.

10. The tensioner system of claim 9 wherein the tensioner system operates in the first condition when the sensor detects an engine speed in a fourth range.

11. The tensioner system of claim 6 wherein the controller is operable to obtain a rate of change of the engine speed from the signal received from the sensor and is operable to move the plunger of the first tensioner and the plunger of the second tensioner based, at least in part, on the rate of change of the engine speed.

* * * * *